(No Model.)
W. H. OSBURN.
DRIVING DEVICE FOR HORSE POWERS.
No. 399,280. Patented Mar. 12, 1889.
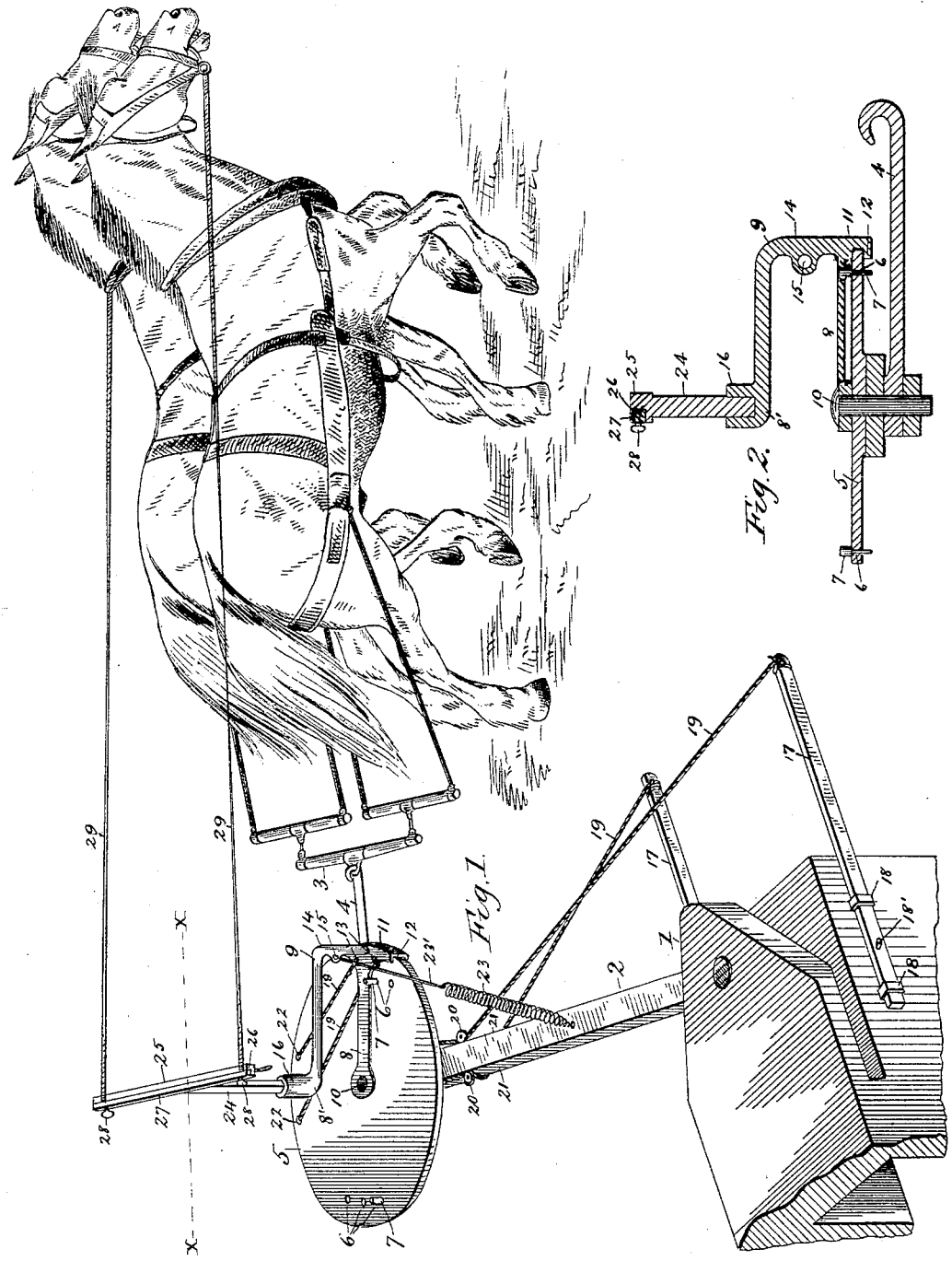
Witnesses:
F. K. Stuart
F. T. Hunter
Inventor:
W. H. Osburn
By Marble & Mason,
Att'ys.

UNITED STATES PATENT OFFICE.

WILLIAM H. OSBURN, OF BURRTON, KANSAS.

DRIVING DEVICE FOR HORSE-POWERS.

SPECIFICATION forming part of Letters Patent No. 399,280, dated March 12, 1889.

Application filed May 24, 1888. Serial No. 274,987. (No model.)

*To all whom it may concern:*

Be it known that I, WILLIAM H. OSBURN, a citizen of the United States, residing at Burrton, in the county of Harvey and State of Kansas, have invented certain new and useful Improvements in Driving Devices for Horse-Powers; and I do hereby declare the following to be a full, clear, and exact description of the invention, such as will enable others skilled in the art to which it appertains to make and use the same.

My invention relates to a driving device in which the movement of an animal or a team at the end of the swing or stroke of a sweep in a so-called "rebounding-plunger" baling-press or similar machine is automatically reversed; and it consists in a device of this character which is provided with a swinging holder for the reins which guide the animal or animals, with a crank having the rein-holder secured thereto, and with means for swinging said crank in an arc of one hundred and eighty degrees (more or less) at the end of each complete swing of the sweep, said crank being attached at the outer end of the sweep, and, further, in the improved construction and arrangement or combination of parts of such a reversing or driving mechanism, which will be hereinafter fully disclosed in the description, drawings, and claims.

The objects of my invention are, first, to provide a driving device which will automatically reverse the movement of the animal or team at each end of the swing or stroke of the sweep; second, to provide means for limiting the degree of the reversing pull upon the reins; third, to control the direction of the pull upon said reins; and, fourth, to provide auxiliary devices for effecting the ends hereinafter fully explained.

In the accompanying drawings, forming part of this specification, and in which the same reference-numerals indicate the same or corresponding parts, Figure 1 represents a perspective view of one end of a rebounding-plunger baling-press provided with my improvements; Fig. 2, a vertical section on line *x x* of Fig. 1, showing the crank and rein holder or driver on an enlarged scale.

In the drawings, the numeral 1 indicates the end of the baling-press, which may be of any desired construction, and which is provided with a sweep, 2, adapted to swing in a horizontal plane. The team, which is shown in the drawings as composed of two animals—although of course the device may be employed for driving one or more animals—is hitched to a doubletree, 3, which is swiveled to the end of the sweep by means of a swivel-hook, 4, or by any other suitable device which will admit of said doubletree swinging entirely around the outer end of the sweep in making each stroke. A circular disk or plate, 5, is secured upon the outer end of the sweep and is formed at points at right angles to the length of said sweep with two series of perforations, 6, three of said perforations being shown in each series, and into which plugs or stops 7 are inserted. The inner end of the lower arm, 8, of a crank, 9, is pivoted upon a bolt, 10, passing through the center of the disk or plate 5, which I shall term the "platform," said crank being thus adapted to swing upon the upper face thereof. The outer end of the lower arm of this crank is provided with a cross-head, 11, which is formed at its ends with downwardly and inwardly projecting flanges or catches 12, which fit around the edge of the platform and hold said crank perfectly straight. This cross-head is furthermore provided with two rings or eyes, 13; also, the wrist-pin 14 of the crank is provided with a ring or eye, 15, and the inner end of the upper arm, 8', of said crank is formed with a square or polygonal vertical socket, 16, which is concentric with the pivotal bolt of the crank.

Two bars or beams, 17, have their inner portions inserted in bails 18 upon the sides of the frame of the press, and are removably secured in place by pins or bolts 18', passed through holes in the same and in the sides of said press, whereby they may be readily detached when in the way in hitching the team or when it is desired to move the press from stack to stack. Two ropes or chains, 19, are removably and adjustably secured at their inner ends to the outer portions of said bars or beams, and pass thence inside of two pulleys, 20, journaled in the sides or edges 21 of the sweep, thence beneath the platform, thence up through two perforations, 22, formed in the outer edge of said platform, which have rounded edges for permitting free and smooth passage of said ropes or chains. The outer ends of these ropes or chains 19 are secured to the rings or eyes 13 of the cross-head 11 of the crank, so that the latter may be tilted or swung by pulling upon said ropes or chains.

A coiled spring, 23, is secured at its inner end to the upper side of the sweep, and at its outer end is secured a cord or rope, 23', which is attached to the ring or eye 15 upon the wrist-pin 14 of the crank. This cord or rope is to be lengthened or shortened and the spring correspondingly expanded or contracted, according to the ease or difficulty with which the animal or team turns. This spring holds the lower arm, 8, of the crank 9 and its cross-head 11 against one of the plugs or stops 7, which is inserted in one of the perforations 6 in the platform 5. These plugs or stops and their perforations serve to limit and adjust the throw of the crank in its horizontal oscillations and to control teams of varying pulling propensities, as hereinafter explained.

An upright rod, 24, having a square or polygonal lower end, is inserted in the socket 16 at the inner end of the upper arm, 8', of the crank. The upper end of this rod is provided with a driver or rein-holder composed of a cross-head, 25, to the rabbeted outer face, 26, of which is secured a clamping-bar, 27, by means of screw-bolts 28. The lines or reins 29 for guiding the team are firmly secured between the rabbeted outer face of said cross-head and the clamping-bar, and may be held near the ends of said cross-head if the animal or team be hard to turn, or nearer the middle of said cross-head if the animal or team be easily turned. The spiral spring 23 is also to be adjusted (loosened or tightened) by the cord or rope 23' to suit the requirements of the animal or team being driven.

It will be understood from the foregoing that the cross-head of the driver will stand at right angles to the crank; that the latter will be drawn inwardly against the plugs or stops by the spring, and that the position of the crank, and consequently of the cross-head, with relation to the team may be adjusted by said stops; that the stops are to be adjusted in the perforations toward the inner edge of the platform when the team is inclined to pull too much in an outward direction, so that the reins or lines will continually pull back upon the team and direct them inwardly, and that the stops are to be adjusted in the perforations toward the outer edge of the platform, so that the reins will be so held by the cross-head as to draw the team outward when they are inclined to pull too much inward or toward the press; that when the team arrives at the end of the stroke of the sweep the rope or chain attached to the bar or beam which is then farthest from the team will be tightened and pull upon the outer end of the crank and draw it out against the tension of the spring; that when said crank has passed over the outermost point of the platform, between the two perforations in the same for the chains or ropes, the spring will draw said crank inwardly against the other stop or plug, reverse the cross-head or driver, and consequently draw in such a manner upon the reins that the team will be reversed and start to move the sweep around in the opposite direction. This reversing operation is repeated at the end of each stroke of the sweep, the ropes or chains reversing the crank and the driver or cross-head at the end of each stroke, and the driver, which controls the reins, whenever it is reversed, reversing the team.

By adjusting the length of the ropes or chains by securing them at different points along the bars or beams, the team may be reversed either at the end of the stroke of the sweep or before the end of the stroke is reached, according to the propensity of the team—as, for instance, the ropes or chains may be lengthened to reverse the team at the end of the stroke, with a team inclined to reverse before the end of the circuit is reached, or the ropes or chains may be shortened to reverse the movement of the team before the end of the stroke is reached in case the team be inclined to continue pulling onward after the stroke is finished; also, by means of this adjustability of the attachment of said chains or ropes the reins can be kept tight at all times, the team caused to pull evenly, and the crank and driver caught and held until the sweep reverses, whereby sudden pulls or jerks upon the mouths of the animals are avoided.

Having thus fully described the construction and arrangement or combination of the several parts of my invention and its operation, what I claim as new is—

1. In an automatic driving device for horse-powers for rebounding-plunger presses and similar machines, the combination of a reversible driver or rein-holder and a sweep provided with means for limiting the throw of said driver, with ropes for reversing said driver at the end of each stroke of said sweep, substantially as described.

2. In an automatic driving device for horse-powers for rebounding-plunger presses and similar machines, a sweep, in combination with a reversible driver or rein-holder mounted thereon, a spring attached to said driver, adjustable stops for limiting its throw, and means for starting its reversing-throw at the end of each stroke of said sweep, substantially as described.

3. In an automatic driving device for horse-powers for rebounding-plunger presses and similar machines, a sweep, in combination with a reversible driver having the lines or reins attached thereto, stops for limiting its throw, a spring for drawing it against said stops, and means for reversing it at the end of each stroke of the sweep, substantially as described.

4. In an automatic driving device for horse-powers for rebounding-plunger presses and similar machines, a sweep, in combination with a pivoted driver having a rein-holder attached thereto, stops arranged at diametrically-opposite points of said sweep, a spring for drawing said driver against said stops, and ropes for throwing said driver around at the end of each stroke of said sweep, substantially as described.

5. In an automatic driving device for horse-powers for rebounding-plunger presses and similar machines, a sweep, in combination with a driver pivoted at the outer end of said sweep and having a rein-holder attached thereto, a crank-arm arranged at right angles to said rein-holder, stops upon the sweep for limiting the throw of said crank-arm to substantially a semicircle, a spring for drawing said crank-arm against said stops, and ropes arranged to alternately throw said crank-arm around at the end of each stroke of the sweep, substantially as described.

6. In an automatic driving device for horse-powers for rebounding-plunger presses and similar machines, a sweep, in combination with a platform mounted thereon and provided with adjustable stops at diametrically-opposite points of its side edges, a driver consisting of a rein-holder, and also of a crank arranged at right angles to said rein-holder, a spring for drawing said crank against said stops, and ropes attached to the end of said crank and passed through perforations formed in the platform at its outer edge and arranged to throw said crank around at the end of each stroke of the sweep, substantially as described.

7. In an automatic driving device for horse-powers for rebounding-plunger presses and similar machines, a sweep, in combination with a platform mounted thereon and formed with perforations in its side edges and with two perforations in its outer edge, a crank pivoted in the center of said platform, an upright rod, a rein-holder arranged at right angles to said crank, stops inserted in the perforations in the side edges of said platform, a spring secured to the end of the crank and also to the sweep, and ropes secured to the end of said crank and passed through the perforations in the outer edge of said platform and adapted to be alternately tightened at the ends of the stroke of the sweep, substantially as described.

8. The combination of the sweep, the spring, the ropes, the circular platform, the driver, the crank pivoted at the center of said platform and provided with the cross-head having eyes or rings for the attachment of said spring and ropes, and formed with the downwardly and inwardly bent flanges or catches fitting around the edge of said platform, substantially as and for the purpose specified.

9. The combination of the sweep, the circular platform mounted upon the end thereof and formed with two series of perforations in its side edges and with two perforations in its outer edge, the crank pivoted at the center of said platform and provided with the flanged cross-head having the eyes or rings, the upright rod, the rein-holder, the stops in the perforations of said platform, the spring secured to the eye or ring on the wrist-pin of said crank, and the ropes secured to the eyes on said cross-head and passed through the perforations in the outer edge of said platform and arranged to be alternately tightened at the ends of the stroke of the sweep, substantially as and for the purpose described.

10. The combination of the sweep, the platform having the perforations 6 and 22, the stops in the said perforations, the crank provided with the flanged cross-head having the eyes or rings, the upright rod, the rein-holder, the spring secured to the eye or ring on the wrist-pin of said crank and to the sweep, the guide-pulleys upon said sweep, the removable bars or beams, the bails upon the sides of the press, and the ropes secured to said bars or beams and to the eyes or rings on said crank and passed over said pulleys and up through the perforations 22 in said platform, substantially as described.

11. The rein-holder consisting of the cross-head having a rabbeted outer face, a clamping-bar, and screw-bolts for securing said clamping-bar to said cross-head, in combination with the sweep and means for automatically reversing said rein-holder at the ends of the stroke of said sweep, substantially as described.

12. The rein-holder consisting of the cross-head having a rabbeted outer face, a clamping-bar, and screw-bolts for securing said clamping-bar to said cross-head, in combination with the sweep and means for automatically reversing said rein-holder at the ends of the stroke of said sweep, said means consisting of the platform provided with stops and perforations, the crank, the spring, and the ropes, substantially as described.

In testimony whereof I affix my signature in presence of two witnesses.

WILLIAM H. OSBURN.

Witnesses:
GEORGE K. SLOUGH,
C. R. HOWARD.